(12) United States Patent  
Moule

(10) Patent No.: US 9,265,163 B2
(45) Date of Patent: Feb. 16, 2016

(54) ELECTRICAL SOCKET APPARATUS

(71) Applicant: Peter Moule, Hertfordshire (GB)

(72) Inventor: Peter Moule, Hertfordshire (GB)

(73) Assignee: Electro Expo Ltd., Surrey (GB)

( * ) Notice: Subject to any disclaimer, the term of this patent is extended or adjusted under 35 U.S.C. 154(b) by 0 days.

(21) Appl. No.: 13/261,874

(22) PCT Filed: Nov. 16, 2012

(86) PCT No.: PCT/GB2012/000840
§ 371 (c)(1),
(2) Date: May 14, 2014

(87) PCT Pub. No.: WO2013/072653
PCT Pub. Date: May 23, 2013

(65) Prior Publication Data
US 2014/0247577 A1     Sep. 4, 2014

(30) Foreign Application Priority Data
Nov. 16, 2011   (GB) .................................. 1119787.8

(51) Int. Cl.
*H01H 9/02* (2006.01)
*H05K 5/00* (2006.01)
*H02G 3/12* (2006.01)
*H02G 3/14* (2006.01)

(52) U.S. Cl.
CPC .............. *H05K 5/0017* (2013.01); *H02G 3/123* (2013.01); *H02G 3/14* (2013.01)

(58) Field of Classification Search
CPC ......... H02G 3/08; H02G 3/081; H02G 3/086; H02G 3/10; H02G 3/12; H02G 3/121; H02G 3/14; H02G 3/123; H05K 5/00; H05K 5/02; H05K 5/0017; H05K 5/03; H05K 5/0247; H01H 9/02
USPC ................. 174/50, 53, 57, 58, 480, 481, 482; 220/3.2–3.9, 4.02; 248/906; 361/837; 439/535
See application file for complete search history.

(56) References Cited

U.S. PATENT DOCUMENTS

| 4,717,348 | A   |   | 1/1988  | Mazzullo et al.         |
|-----------|-----|---|---------|-------------------------|
| 4,874,904 | A   | * | 10/1989 | DeSanti ........... 174/53 |
| 5,160,808 | A   | * | 11/1992 | Hadfield .......... 174/480 |
| 6,586,672 | B2  | * | 7/2003  | Kobus et al. ...... 174/50 |
| 6,586,679 | B2  | * | 7/2003  | Bashford .......... 174/58 |
| 7,667,136 | B2  | * | 2/2010  | Dinh et al. ....... 174/58 |
| 7,759,576 | B1  | * | 7/2010  | Gretz ............. 174/58 |

(Continued)

FOREIGN PATENT DOCUMENTS

DE       10020217 A1   10/2001
WO       WO-02/13323 A1   2/2002

(Continued)

*Primary Examiner* — Angel R Estrada
(74) *Attorney, Agent, or Firm* — Blank Rome LLP; Charles R. Wolfe, Jr.

(57) ABSTRACT

Electrical socket apparatus comprises a frame-shaped square front plate and a circular socket box which, in use, is set in a similarly shaped opening formed in the wall or other surface. The front plate includes fixing elements" positioned to engage complementary fixing elements present on or in an inwardly extending lip around the periphery of the open end of the socket box. The front plate is dimensioned to cover, in use, the entire periphery of the open end of the socket box. In use, the front plate is trapped between a switch and the wall surface within which the socket box is located.

6 Claims, 3 Drawing Sheets

(56) References Cited

U.S. PATENT DOCUMENTS

| | | | |
|---|---|---|---|
| 7,897,870 B1 * | 3/2011 | Gretz | 174/58 |
| 8,445,779 B1 * | 5/2013 | Gretz | 174/53 |
| 8,581,098 B2 * | 11/2013 | Von Gal | 174/53 |
| 2007/0194180 A1 | 8/2007 | Korcz | |

FOREIGN PATENT DOCUMENTS

| WO | WO-03/028181 A1 | 4/2003 |
|---|---|---|
| WO | WO-2010070376 A1 | 6/2010 |

* cited by examiner

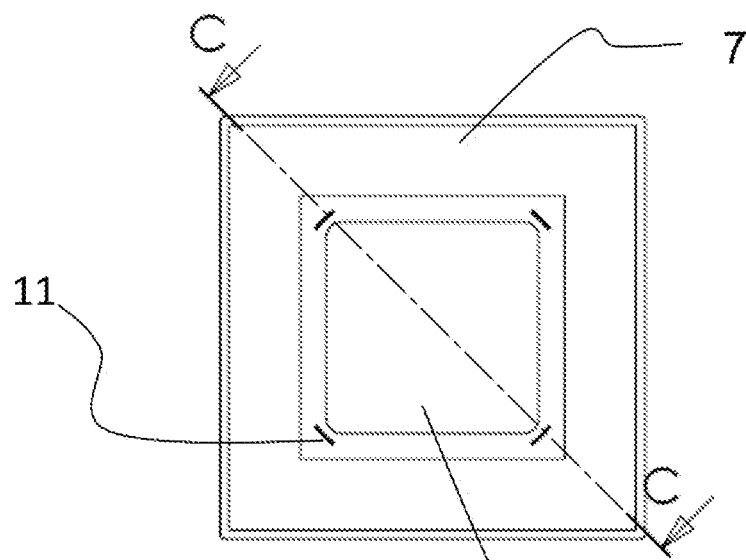
Fig. 4
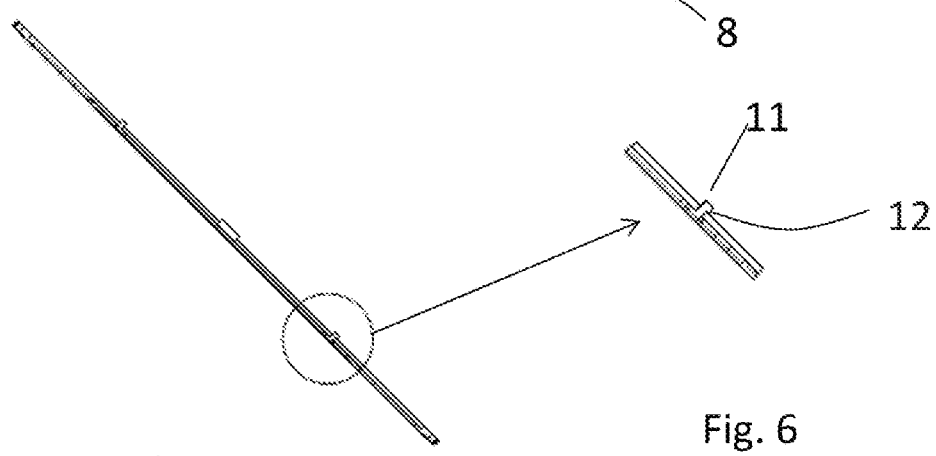
Fig. 5
Fig. 6

ELECTRICAL SOCKET APPARATUS

This invention relates to electrical socket apparatus

As is well known, electrical socket boxes are employed to enable electrical appliances to be connected to mains wiring of a house or other building. Socket boxes are open-sided to receive terminals located on the rear face of electric, switches, and are generally located, in use, in suitably sized openings formed in a wall or other surface. On many occasions, the terminal-bearing rear face of the switch is sufficiently large to cover entirely the wall opening leaving no gaps between the switch and the wall opening. On some occasions, however, the opening is not entirely covered by the rear face of the switch leaving gaps between the switch and the perimeter of the opening. This is both dangerous and unsightly. Such gaps may well be present when fitting a square or rectangular switch to a round or circular socket box.

Circular section socket boxes have the advantage of being easier to install than those of square or rectangular socket boxes and have the additional advantage of being able to rotate within a wall opening of the same shape for ease of connection of the individual mains wires to the appropriate terminals of the switch. However, on many occasions the diameter of a circular section socket box is larger than the height of the switch thereby leaving gaps between the switch boundary and the open side of the socket box.

One objective of this invention is to provide socket box apparatus which does not suffer from this disadvantage.

In one aspect, the invention provides electrical socket apparatus comprising an open-sided socket box of circular cross section for location within a similarly shaped opening-set in a wall or other surface, the socket box including at its open end an inwardly projecting annular lip formed with a plurality of fixing elements, an electrical switch socket connectable to the socket box and including a rectangular front face including sockets for receiving pins of an electric plug of an electrical appliance and a rear face from which protrude terminals for connection to mains wiring to be retained within the socket box, and a frame-shaped rectangular front plate whose length and height are greater than the length and height of the front face of the switch socket and which includes fixing elements complementary to those of the annular lip of the socket box, the front plate, in use of the apparatus, being positioned between the switch socket and the wall or other surface into which the socket box is mounted with the boundaries of the open end of the socket box and the wall or other surface opening in which the socket box is located entirely covered by the front plate.

The front plate and the switch may be square.

The fixing elements of the annular lip of the socket box may comprise recesses or openings formed in the lip, and those of the front plate may comprise clips or projections which respectively locate over and behind the recesses, or projections which protrude into the openings.

Alternatively, the fixing elements of the annular lip may comprise clips or projections and those of the front plate may comprise recesses or openings.

In another aspect, the invention provides electrical socket apparatus comprising a frame-shaped rectangular front plate and a socket box which, in use, is set in an opening formed in the wall or other surface, the front plate including fixing elements positioned to engage complementary fixing elements present on or in an inwardly extending lip around the periphery of the open end of the socket box, the front plate being dimensioned to cover, in use, the entire periphery of the open end of the socket box.

The socket box may be circular in cross section.

The invention will now be described with reference to the accompanying diagrammatic drawings in which:

FIG. 4 is a plan view of a backing plate of the illustrated apparatus;

FIG. 5 is a section taken along line C-C of FIG. 4; and

FIG. 6 is a detailed view of the circled area of FIG. 5.

Figure 1:
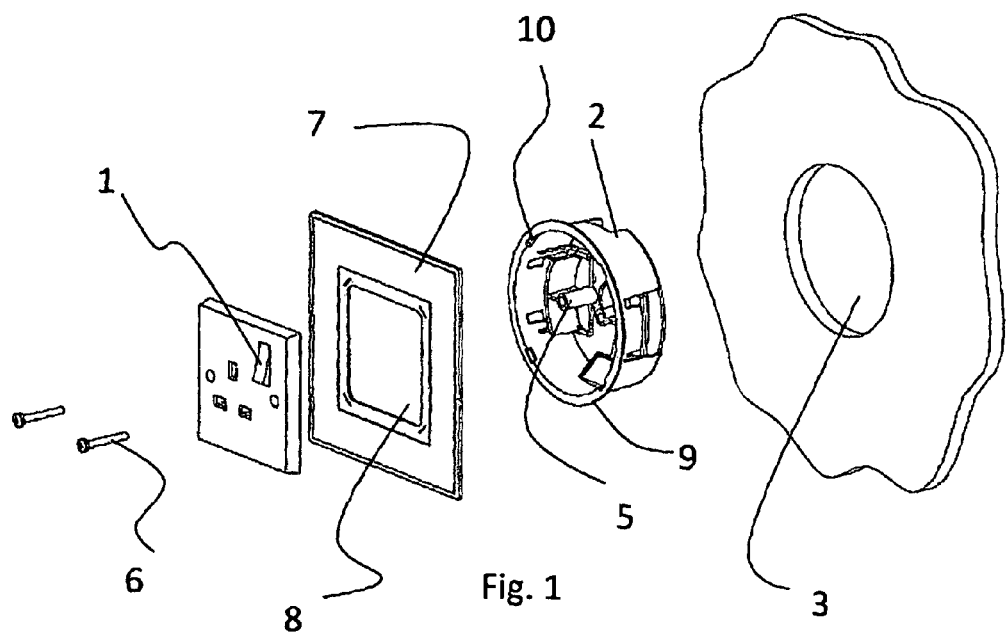
FIG. 1 is an exploded view in perspective of socket box apparatus in accordance with the invention.

The socket box apparatus illustrated in the drawings includes a conventional switch 1 for connecting an electrical appliance to the mains circuit of a building. As is conventional, the switch is square shaped in plan. The rear face of the switch carries terminals for connection to mains wiring drawn into a socket box 2 from the ring main of the building. As shown, the socket box is circular in cross section.

Figure 2:
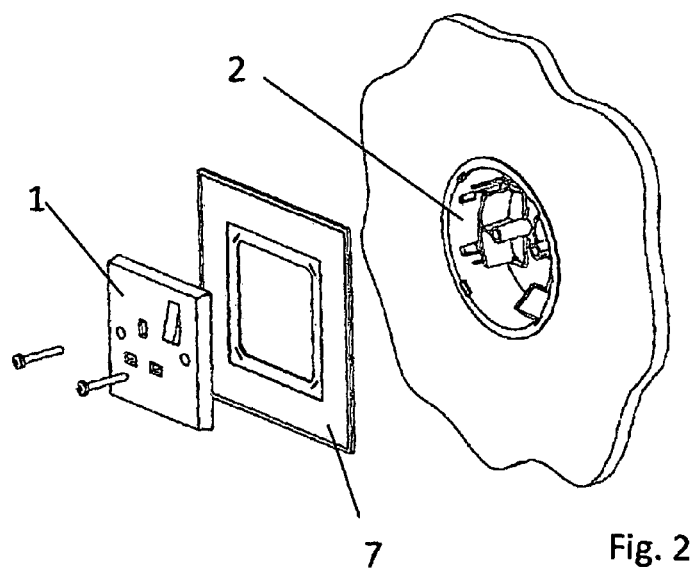
FIG. 2 is a perspective view of the apparatus illustrated in FIG. 1 partially installed in a wall surface.

As shown in FIG. 2, the socket box 2 is located in a similarly shaped opening 3 formed in a wall surface 4. The socket box conventionally includes fixing sleeves 5 for receiving screws 6 of the switch 1. Positioned between the rear face of the switch 1 and the socket box 2 is a frame-shaped front plate 7 formed with a central square shaped opening 8.

Figure 3:
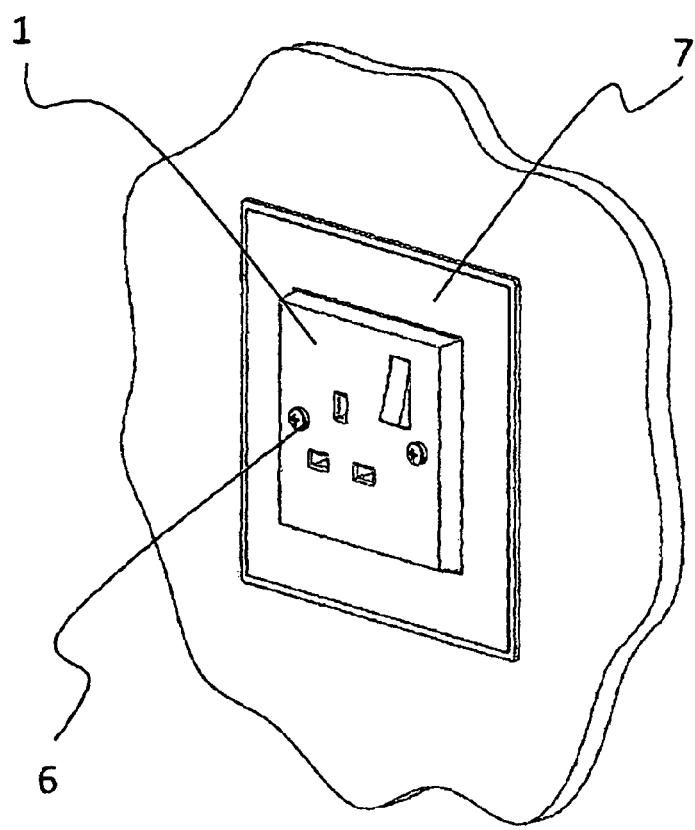
FIG. 3 shows the apparatus when fully installed in a wall surface.

As will be seen from FIG. 3, the overall length and width of the front plate 7 are each larger than the length and width of the switch 1. It will also be seen from FIG. 3 that the front plate dimensions are larger than the maximum dimension of the opening 3.

The width and length of the plate opening 8 are each less than the width and length of the switch so that, as will again be seen from FIG. 3, the rear face of the switch is bordered by the plate 7.

The widths of the sides of the front plate 7 are sufficient to cover entirely the perimeter of the socket box 2 and the wall opening 3 without impeding access to the interior of the socket box when fitted.

As will be seen from FIGS. 1 and 2, the socket box 2 has at its open end an annular lip 9 formed with four recesses which define ledges 10. The ledges 10 define fixings which, as described below, enable the front plate 7 to be connected to the socket box 1.

As will be seen more clearly from FIGS. 4 and 5, the front plate 7 includes four projections 11 each having a sideways extending lip 12. The ledges 10 and the lips 12 define fixings complementary to those of the socket box. That is to say, the lips can locate below the ledges and within the confines of the lip 9 to connect the front plate 7 to the socket box 2.

On assembly of the illustrated apparatus, the socket box 1 is installed in the wall opening 3. Mains wiring drawn into the socket box is then connected to the switch terminals with the front plate positioned between the switch and the socket box. Once connected, the front plate is positioned over the wall opening 3 with the fixings of the front plate located in the recesses and behind the ledges 10. The switch is then secured to the socket box by means of the screws 6.

It will be appreciated that the foregoing is exemplary of apparatus in accordance with the invention and that modifications can readily be made thereto without departing from the true scope of the invention as set out in the appended claims.

The invention claimed is:

1. Electrical socket apparatus comprising an open-sided socket box of rounded or circular cross section for location within a similarly shaped opening set in a wall or other surface, the socket box including an open end having an integrally formed inwardly projecting annular lip formed with a plurality of fixing elements, an electrical switch socket connectable to the socket box and including a rectangular front face including sockets for receiving pins of an electric plug of an electrical appliance and a rear face from which protrude terminals for connection to mains wiring to be retained within the socket box, and a frame-shaped rectangular front plate whose length and height are greater than a length and height of the front face of the switch socket and which includes fixing elements directly connected to the fixing elements of the annular lip of the socket box, wherein the front plate, in use of the apparatus, is positioned between the switch socket and the wall or other surface into which the socket box is mounted with the boundaries of the open end of the socket box and the wall or other surface opening in which the socket box is located entirely covered by the front plate.

2. Apparatus as claimed in claim 1 wherein the front plate and the switch are square and the socket box circular.

3. Apparatus as claimed in claim 1 wherein the fixing elements of the annular lip of the socket box comprise recesses or openings formed in the lip, and those of the front plate comprise clips or projections which respectively locate over and behind the recesses, or protrude into the openings.

4. Apparatus as claimed in claim 1 wherein the fixing elements of the annular lip comprise clips or projections and those of the front plate comprise recesses or openings.

5. Apparatus as claimed in claim 2 wherein the fixing elements of the annular lip of the socket box comprise recesses or openings formed in the lip, and those of the front plate comprise clips or projections which respectively locate over and behind the recesses, or protrude into the openings.

6. Apparatus as claimed in claim 2 wherein the fixing elements of the annular lip comprise clips or projections and those of the front plate comprise recesses or openings.

* * * * *